US008803385B2

(12) United States Patent
Isogai et al.

(10) Patent No.: US 8,803,385 B2
(45) Date of Patent: Aug. 12, 2014

(54) DRIVE DEVICE FOR HYBRID VEHICLE AND CASE FOR THE SAME

(75) Inventors: Shigetaka Isogai, Nishio (JP); Hideki Nakamura, Nagoya (JP); Jun Abiko, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 329 days.

(21) Appl. No.: 13/227,833

(22) Filed: Sep. 8, 2011

(65) Prior Publication Data

US 2012/0062077 A1 Mar. 15, 2012

(30) Foreign Application Priority Data

Sep. 10, 2010 (JP) ................................ 2010-202693

(51) Int. Cl.
*H02K 24/00* (2006.01)
*G01D 5/20* (2006.01)
*B60L 1/00* (2006.01)

(52) U.S. Cl.
USPC ..................... 310/68 B; 324/207.13; 310/71

(58) Field of Classification Search
USPC ..................... 310/68 B; 324/207.13, 207.25
See application file for complete search history.

(56) References Cited

U.S. PATENT DOCUMENTS

| 6,373,155 B1 * | 4/2002 | Shimizu et al. ............. 310/68 B |
| 6,481,517 B1 * | 11/2002 | Kobayashi et al. ........ 180/65.26 |
| 6,666,289 B2 * | 12/2003 | Shimizu ..................... 180/65.26 |
| 6,679,796 B2 * | 1/2004 | Sugano ........................... 474/28 |
| 8,448,541 B2 * | 5/2013 | Kasuya et al. .................. 74/661 |
| 2006/0220479 A1 * | 10/2006 | Hasegawa ...................... 310/85 |
| 2010/0259118 A1 | 10/2010 | Kitagawa |

FOREIGN PATENT DOCUMENTS

| JP | 11078556 | * | 3/1999 | ............ B60K 17/04 |
| JP | 2007-336714 A | | 12/2007 | |
| JP | 2009-142056 A | | 6/2009 | |
| JP | 2009-154824 A | | 7/2009 | |
| JP | 2010-127838 A | | 6/2010 | |
| JP | 2010-200418 A | | 9/2010 | |

OTHER PUBLICATIONS

Japanese Office Action issued on Jan. 21, 2014 by the Japan Patent Office in corresponding Japanese Patent Application No. 2010-202693, and an English language translation of the Office Action. (5 pages).

* cited by examiner

*Primary Examiner* — Burton Mullins
(74) *Attorney, Agent, or Firm* — Buchanan Ingersoll & Rooney PC (57) ABSTRACT

A drive device for a hybrid vehicle includes an input shaft, a motor having a rotor and a stator, an output shaft integrally and coaxially connected to the rotor along a rotation axis and configured so as to be engaged with and disengaged from the input shaft, a rotation angle sensor including a rotating portion and a fixed portion, which forms an angle relative to the rotating portion, and detecting a rotation angle of the rotor, and a case rotatably and axially supporting the input shaft and the output shaft on the rotation axis and accommodating the motor and the rotation angle sensor, wherein a side wall portion of the case includes an angle adjusting member coaxially supporting the fixed portion relative to the rotation axis while allowing the angle of the fixed portion to be adjustable, and a clamp member supporting a harness movably connected to the fixed portion.

9 Claims, 5 Drawing Sheets

DRIVE DEVICE FOR HYBRID VEHICLE AND CASE FOR THE SAME

CROSS REFERENCE TO RELATED APPLICATIONS

This application is based on and claims priority under 35 U.S.C. §119 to Japanese Patent Application 2010-202693, filed on Sep. 10, 2010, the entire content of which is incorporated herein by reference.

TECHNICAL FIELD

This disclosure generally relates to a drive device for a hybrid vehicle having an engine and a motor as driving sources and a case for the drive device for the hybrid vehicle. More specifically, this disclosure pertains to an attachment configuration of a sensor detecting a rotation angle of the motor.

BACKGROUND DISCUSSION

Various types of a drive device are suggested for a hybrid vehicle having an engine and a motor as driving sources. For example, a known drive device for a hybrid vehicle includes an input shaft rotatably connected to an engine, an output shaft integrally connected to a rotor of a motor as a unit, and a clutch apparatus connecting the input shaft and the output shaft so as to be engageable with each other and disengageable from each other. The output shaft is connected to a transmission apparatus via a torque converter, thereby configuring a power train led to a driving wheel. Alternatively, the output shaft is directly connected to the transmission apparatus. Accordingly, the vehicle may be driven by the engine alone or the motor alone, or the vehicle may be driven by a combination of the engine and the motor when a large driving force is required. Furthermore, the motor may be used as a generator, so that a battery is charged by energy regeneration executed when the engine is driven or when brake is applied to the vehicle.

According to the known drive device for the hybrid vehicle, the input shaft and the output shaft are engaged with each other and disengaged from each other by means of the clutch apparatus. Therefore, the input shaft and the output shaft are allowed to rotate separately from and independently of each other. Hence, in order to detect a rotation angle, a rotation speed and the like of the rotor of the motor and the output shaft, a rotation angle sensor is generally used. A resolver using the law of electromagnetic induction is commonly used as the rotation angle sensor. The resolver is configured so that a resolver rotor is provided at the rotor of the motor and a resolver stator is provided at a case of the drive device. A harness connected to the resolver stator is arranged within the case and is led to an outside of the case via a relay terminal block. An arrangement (wiring) example of the resolver harness is disclosed in JP2009-142056A.

A vehicle drive device disclosed in JP2009-142056A includes a motor, a resolver and plural cooling oil passages. According to the vehicle drive device disclosed in JP2009-142056A, a resolver harness is arranged (wired) so as to avoid the cooling oil passages, each of which is defied by an outlet pipe curving in a direction orthogonal to a rotor shaft. Furthermore, as disclosed in Claim 3 and FIGS. 1 and 3 of JP2009-142056A, a U-shaped clamp portion is used in order to secure the resolver harness. Accordingly, a cooling performance may be ensured and the resolver harness may be avoided from being damaged.

Disclosed in JP2009-154824A is another example of a known technology relating to the retention of the harness. More specifically, disclosed in JP2009-154824A is a wiring configuration of a battery accommodating portion. According to JP2009-154824A, a harness, which is displaced in response to pilling out and storing of a battery stand, is attached at first and second clamp portions, which relatively displace the harness. Furthermore, a deflection portion, which deflects in a predetermined shape between the first and second clamp portions, is formed at the harness. Therefore, according to JP2009-154824A, the battery stand is surely pulled out and stored without being influenced by the wiring of the harness.

Generally, the rotation angle sensor including the resolver has a rotating portion, which is provided at a portion that rotates, and a fixing portion, which is provided at the case. Furthermore, generally, a relative angular position of the fixing portion is adjusted when attaching the rotation angle sensor in order to obtain an output corresponding to a rotational phase of the rotating portion. A position of the harness, which is connected to the fixing portion, may be changed in response to the adjustment of the relative rotation angle of the fixing portion. Therefore, when using the U-shaped clamp portion of JP2009-142056A, the harness may strain when the relative angular position of the fixing portion is adjusted, which may result in applying a tensile force to the harness and the harness may be broken. In order to solve the above-mentioned drawbacks, a length of the harness may need to be set to have an allowance. However, in this case, the harness may move due to vibration of the vehicle, so that the harness may be rubbed against a case inner surface or contact the rotation portion such as the rotor and the like.

According to JP2009-154824A, which discloses that the harness is secured at two points and the deflection portion is formed at an intermediate portion between two securing portions, the harness may be avoided from being damaged. However, the configuration of the wiring of the harness may be complicated. The technology disclosed in JP2009-154824A is adaptable to a harness of a battery having a large current capacity. However, the technology disclosed in JP2009-154824A may not be suitable for a sensor harness generating a weak signal, because the configuration of the wiring becomes unnecessarily complicated, which may result in increasing manufacturing costs.

A need thus exists for a drive device for a hybrid vehicle and a case for the same which is not susceptible to the drawback mentioned above.

SUMMARY

According to an aspect of this disclosure, a drive device for a hybrid vehicle, includes an input shaft rotatably connected to an engine, a motor having a rotor and a stator, an output shaft arranged on a rotation axis in a coaxial manner with the rotor so as to be integrally connected to the rotor as a unit and configured so as to be engaged with and disengaged from the input shaft, a rotation angle sensor including a rotating portion, which is provided at the rotor so as to rotate together with the rotor as a unit, and a fixed portion, which is provided so as not to be rotate and which forms an angle relative to the rotating portion, and detecting a rotation angle of the rotor, and a case rotatably and axially supporting the input shaft and the output shaft on the rotation axis and accommodating the motor and the rotation angle sensor, wherein a side wall portion of the case, which extends in a direction orthogonal to the rotation axis, includes an angle adjusting member supporting the fixed portion of the rotation angle sensor in the coaxial manner relative to the rotation axis while allowing the angle of the fixed portion to be adjustable, and a clamp member supporting a harness, which is connected to the fixed portion of the rotation angle sensor, while allowing the harness to be movable.

According to another aspect of this disclosure, a case includes a motor having a rotor, a rotation angle sensor including a rotating portion, which is provided at the rotor and is rotated together with the rotor as a unit, and a fixed portion, which does not rotate and which forms an angle relative to the rotating portion, and detecting a rotation angle of the rotor, and a clamp member including a rotation adjusting member, which arranges the fixed portion of the rotation angle sensor to be coaxial relative to a rotation axis of the rotor and which adjusts the angle formed between the fixed portion and the rotating portion, and supporting a harness, which is connected to the fixed portion, while allowing the harness to be movable.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
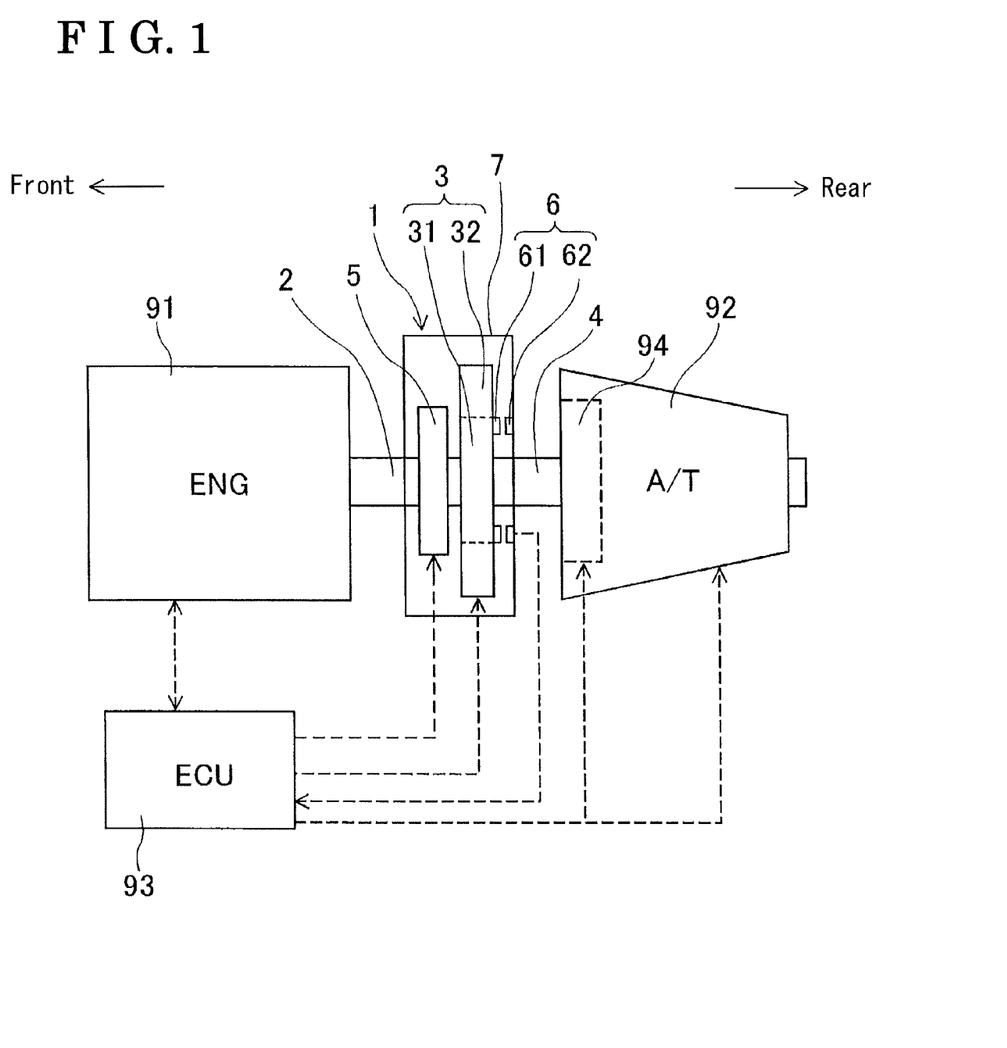
FIG. 1 is a diagram schematically illustrating a power train for a hybrid vehicle having a drive device for the hybrid vehicle according to an embodiment.

A drive device for a hybrid vehicle, which will be hereinafter referred to as a drive device 1, according to an embodiment will be described below with reference to FIGS. 1 to 6 of the attached drawings. Illustrated in FIG. 1 is a schematic diagram of a power train for the hybrid vehicle having the drive device 1. A dashed arrow indicates a flow of a control. The power train for the hybrid vehicle is configured with an engine 91 (ENG 91), the drive device 1, an automatic transmission apparatus 92 (A/T 92) and the like. The drive device 1 for the hybrid vehicle includes an input shaft 2, a motor 3, an output shaft 4, a clutch apparatus 5, a resolver 6, a case 7 and the like. Furthermore, the drive device 1 includes an electronic control unit 93, which will be hereinafter referred to as an ECU 93, that receives a detection signal from the resolver 6 and that controls the engine 91, the automatic transmission apparatus 92, the motor 3 and the clutch apparatus 5. In this embodiment, the left side in FIG. 1, i.e. the input shaft 2 of the drive device 1 corresponds to a front side of the hybrid vehicle. On the other hand, the right side in FIG. 1, i.e. the output shaft 4 of the drive device 1 corresponds to a rear side of the hybrid vehicle.

As illustrated in FIG. 1, the input shaft 2 of the drive device 1 for the hybrid vehicle is rotatably connected to the engine 91. The motor 3 includes a rotor 31 located at a radially inner portion thereof in a radial direction of the motor 3 and a stator 32 located outwardly of the rotor 31 in the radial direction. The output shaft 4 is integrally connected to the rotor 31 of the motor 3 as a unit in a coaxial manner relative to a rotation axis of the rotor 31. Furthermore, the output shaft 4 is connected to a torque converter 94, which is connected to the automatic transmission apparatus 92. The torque converter 94 includes a lock-up clutch, so that the torque converter 94 is configured so as to convert an output torque from the output shaft 4 and transmit the converted output torque to the automatic transmission apparatus 92. Alternatively, the torque converter 94 directly transmits the output torque from the output shaft 4 to the automatic transmission apparatus 92. An output shaft of the automatic transmission 92 is connected to a driving wheel via an axle. The clutch apparatus 5 connects the input shaft 2 and the output shaft 4 while allowing the input shaft 2 and the output shaft 4 to be engaged with and disengaged from each other. The resolver 6 is a rotation angle sensor using the law of electromagnetic induction. More specifically, the resolver 6 includes a resolver rotor 61 (i.e. a rotating portion), which is fixed at the rotor 31 of the motor 3 in a coaxial manner, and a resolver stator 62 (i.e. a fixed portion), which is provided at the case 7. The case 7 axially supports the input shaft 2 and the output shaft 4 and accommodates the motor 3, the clutch apparatus 5 and the resolver 6. The drive device 1 of this disclosure may be achieved without being influenced by a shape, a configuration and the like of each of the engine 91 (a front stage), the torque converter 94 (a subsequent stage) and the automatic transmission apparatus 92.

Figure 2:
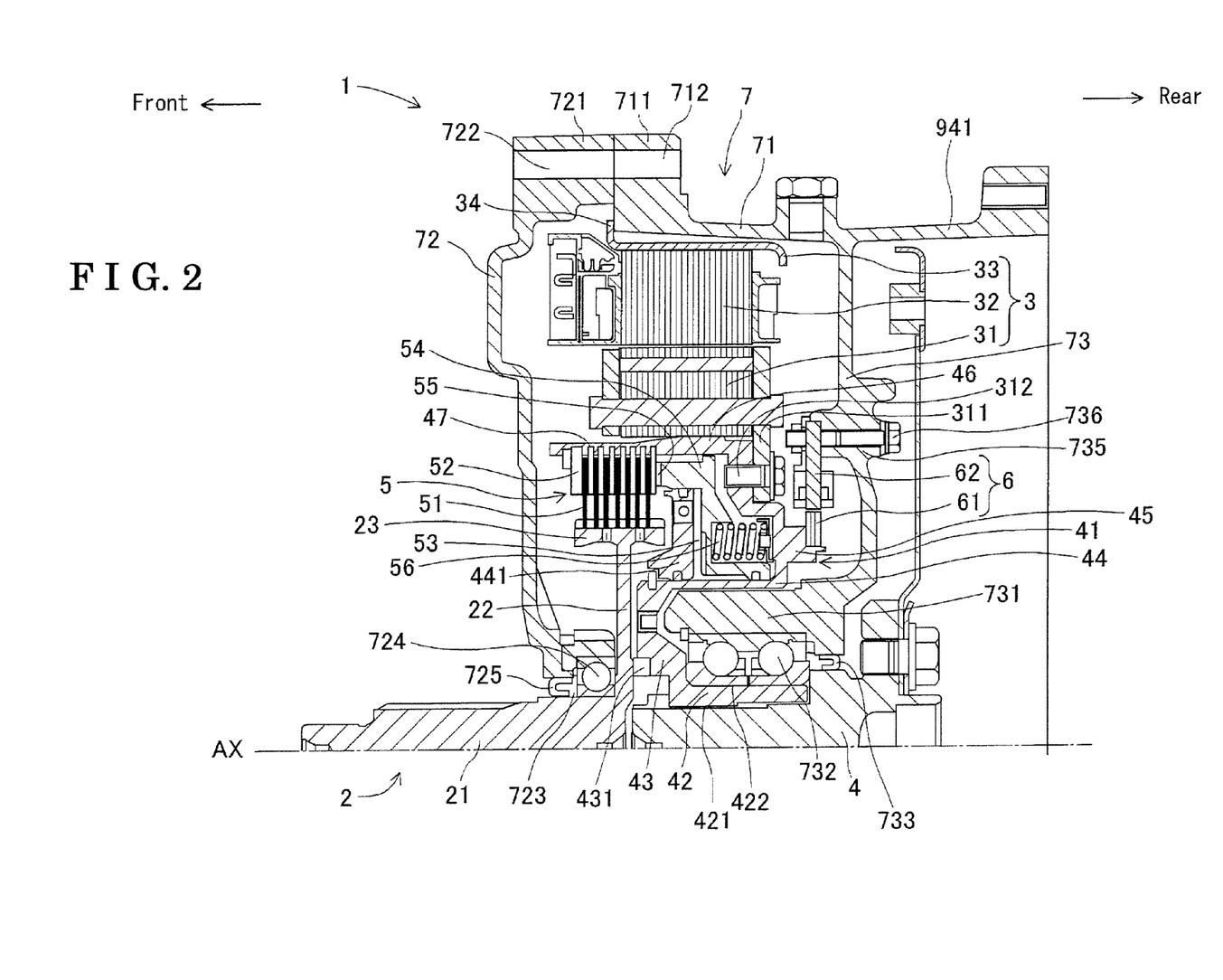
FIG. 2 is a cross-sectional diagram illustrating a configuration of an upper half of the drive device for the hybrid vehicle relative to a rotation axis when being viewed in a direction orthogonal to the rotation axis.

Illustrated in FIG. 2 is a cross-sectional diagram when the drive device 1 is viewed in a direction orthogonal to an axial direction thereof for explaining the configuration of the drive device 1. More specifically, illustrated in FIG. 2 is an upper half of the drive device 1 relative to a rotation axis AX. The case 7 is configured with a circumferential wall portion 71, a front side wall portion 72 positioned closer to the input shaft 2, and a rear side wall portion 73 (i.e. a side wall portion) positioned closer to the output shaft 4. The circumferential wall portion 71 is formed as a cylindrical-shaped member, which is laterally arranged so as to extend along the rotation axis AX. As illustrated in FIG. 2, a flange portion 711, which extends in a radially outward direction, is formed at a front portion of the circumferential wall portion 71. Furthermore, the rear side wall portion 73 is integrally formed at a portion of an inner circumferential surface of the circumferential wall portion 71 located rearwardly relative to an intermediate portion of the circumferential wall portion 71 in an axial direction thereof so as to extend in a radially inward direction, which is orthogonal to the rotation axis AX. A rear portion of the circumferential wall portion 71 extends rearwardly of the rear side wall portion 73 and configures a portion of a case 941 of the torque converter 94.

The front side wall portion 72 is a disc shaped member having a stepped portion. A flange portion 721 is formed at an outer circumferential portion of the front side wall portion 72. A connecting bore 712 and a connecting bore 722 are formed at the flange portion 711 of the circumferential wall portion 71 and the flange portion 721 of the front side wall portion 72, respectively, so as to penetrate therethrough at a position where the flange portion 711 and the flange portion 721 face with each other. In other words, the connecting bore 712 and the connecting bore 722 are formed so as to align in a front-rear direction (i.e. along the rotation axis AX). Furthermore, the flange portion 711 and the flange portion 721 are connected with one another by means of a connecting bolt, which is provided so as to penetrate through the connecting bore 712 and the connecting bore 722. A through hole 723 is formed at a center portion of the front side wall portion 72 in the radial direction. A ball bearing 724 is provided between an inner circumferential surface of the through hole 723 and the input shaft 2. Accordingly, the front side wall portion 72 rotatably and axially supports the input shaft 2. Furthermore, an oil sealing portion 725 is provided between the inner circumferential surface of the through hole 723 and the input shaft 2 at a position forwardly of the ball bearing 724, so that a clearance formed between the inner circumferential surface of the through hole 723 and an outer circumferential surface of the input shaft 2 is fluid tightly sealed by the oil sealing portion 725.

A support base 731 is formed at a center portion of the rear side wall portion 73 in the radial direction so as to extend along the rotation axis AX. A ball bearing 732 is provided on an inner circumferential surface of the support base 731 in the radial direction. Accordingly, the rear side wall portion 73 rotatably and axially supports an auxiliary output shaft 41. Furthermore, an oil sealing portion 733 is provided between the inner circumferential surface of the support base 731 in the radial direction and the output shaft 4 at a position rearwardly of the ball bearing 732, so that a clearance formed between the inner circumferential surface of the support base 731 and an outer circumferential surface of the output shaft 4 is fluid tightly sealed by the oil sealing portion 733. An inner space of the case 7 is defied by the circumferential wall portion 71, the front side wall portion 72 and the rear side wall portion 73, so that an oil, which is used for lubricating and cooling the drive device 1 and actuating the clutch apparatus 5, is accommodated in the inner space.

The input shaft 2 integrally includes a shaft portion 21, a diameter enlarged portion 22 and a clutch base 23 as a unit. The shaft portion 21 is connected to the engine 91 and is axially supported by the ball bearing 724. The diameter enlarged portion 22 is formed at a rear end portion of the shaft portion 21 so as to extend (protrude) in the radially outward direction. The clutch base 23 is formed at an outer circumferential end portion of the diameter enlarged portion 22 in the radial direction so as to extend along the rotation axis AX.

The motor 3 is formed so as to be rotationally symmetric relative to the rotation axis AX. The motor 3 includes the rotor 31, which is arranged at the radially inward position of the motor 3, and the stator 32, which is retained at an inner surface of a stator holder 33 formed in a cylinder shape and which is arranged radially outwardly of the rotor 31. The stator holder 33 includes a flange portion 34, which extends (protrudes) in the radially outward direction from a front end surface of the stator holder 33 in the direction of the rotation axis AX. The flange portion 34 is fixed on the flange portion 711 of the circumferential wall portion 71. More specifically, in this embodiment, a circumferentially outer end portion of the flange portion 34 is fixed on a lower portion of a front end surface of the flange portion 711 of the circumferential wall portion 71. Accordingly, the stator 32 is fixed on (secured to) the circumferential wall portion 71.

The rotor 31 of the motor 3 is integrally connected to the auxiliary output shaft 41, which is arranged on the rotation axis AX. Furthermore, the auxiliary output shaft 41 is integrally connected to the output shaft 4, which is arranged on the rotation axis AX. Accordingly, the drive device 1 is configured so that the rotor 31, the auxiliary output shaft 41 and the output shaft 4 are rotatable as a unit about the single rotation axis AX. The output shaft 4 is formed to rearwardly protrude relative to a rear portion of the rear side wall portion 73 and is connected to the torque converter 94. The auxiliary output shaft 41 is formed so that a rotating section thereof is formed in an S-shape. Furthermore, the auxiliary output shaft 41 integrally includes an inner cylinder portion 42, an inner diameter enlarged portion 43, an intermediate cylinder portion 44, an outer diameter enlarged portion 45 and an outer cylinder portion 46.

The inner cylinder portion 42, which is located at a radially innermost position of the auxiliary output shaft 41 and which extends in parallel with the rotation axis AX, is integrally connected to the output shaft 4 at an inner circumferential surface 421 of the inner cylinder portion 42. Furthermore, the inner cylinder portion 42 is axially and rotatably supported by the ball bearing 732, which is arranged closer to the rear side wall portion 73, at an outer circumferential surface 422. The inner diameter enlarged portion 43 extends in the radially outward direction from a front end portion of the inner cylinder portion 42. A thrust needle bearing 431 is provided between a front portion of the inner diameter enlarged portion 43 and the diameter enlarged portion 22 of the input shaft 2, so that the input shaft 2 and the auxiliary output shaft 42 are allowed to rotate relative to each other. The intermediate cylinder portion 44 rearwardly extends from a radially outer end portion of the inner diameter enlarged portion 43. The outer diameter enlarged portion 45 extends in the radially outward direction from a rear end portion of the intermediate cylinder portion 44. The outer cylinder portion 46 forwardly extends from a radially outer end portion of the outer diameter enlarged portion 45 so as to extend over an outer circumferential surface of the clutch base 23 of the input shaft 2. The rotor 31 of the motor 3 is fittedly provided on an outer circumferential surface of the outer cylinder portion 46. An end plate 311, which is provided at a position rearwardly of the rotor 31, extends in the radially inward direction and is fixed on a rear surface of a radially outer portion of the outer diameter enlarged portion 45 by means of a fixing bolt 312.

The clutch apparatus 5 is configured as a multi-plate friction clutch, which is provided at an area defined by the intermediate cylinder portion 44, the outer diameter enlarged portion 45 and the outer cylinder portion 46 of the auxiliary output shaft 41 and the clutch base 23 of the input shaft 2. More specifically, plural clutch plates 51, each of which is formed in an annular shape, are provided so as to extend in the radially outward direction from the clutch base 23 of the input shaft 2. A front portion of the outer cylinder portion 46 formed on the auxiliary output shaft 41 serves as a clutch base 47. Plural pressure plates 52, each of which is formed in an annular shape, are provided so as to extend in the radially inward direction from the clutch base 47. The clutch plates 51 and the pressure plates 52 are arranged in an alternate manner. Furthermore, each of the clutch plates 51 and each of the pressure plates 52 are configured so as to be engaged with each other and so as to be disengaged from each other.

A partition member 441 is provided at an outer circumferential surface of the front portion of the intermediate cylinder portion 44 configuring the auxiliary output shaft 41. Accordingly, a cylinder space 53 in an annular shape is defined by the partition member 441, the intermediate cylinder portion 44, the outer diameter enlarged portion 45 and the outer cylinder portion 46. The cylinder space 53 is fluid tightly closed by a sealing member. Furthermore, a piston member 54, which is formed in an annular shape and which is actuated by oil provided in the cylinder space 53 so as to be moved in the front-rear direction along the rotation axis AX, is provided in the cylinder space 53. The piston member 54 is forwardly biased by a biasing spring 56, whose one end is fixed on a front surface portion of the outer diameter enlarged portion 45. A pressing portion 55, which is formed at a front portion of an outer circumferential portion of the piston member 54, presses the pressure plates 52 while a normal state where the oil is not supplied to the cylinder space 53 (see FIG. 2) is established. In other words, the clutch apparatus 5 is configured as a normally closed-type clutch. Accordingly, the input shaft 2 and the auxiliary output shaft 41 engage with each other in the normal state, so that the hybrid vehicle is driven by the engine 91.

An electric oil pump is provided at the drive device 1 and an oil passage is formed at the drive device 1 in order to actuate the clutch apparatus 51. The electric oil pump sucks the oil within the case 7 and supplies the oil to the cylinder space 53 through the oil passage. Accordingly, the piston member 54 is rearwardly displaced so as to resist against a biasing force generated by the biasing spring 56, so that pressing of the pressing portion 55 is released. As a result, the clutch apparatus 5 is interrupted (i.e. the clutch apparatus 5 turns to be in a disengaged state). In other words, the input shaft 2 and the auxiliary output shaft 41 are disengaged from each other.

The resolver 6 includes the resolver rotor 61, which is provided at the auxiliary output shaft 41 that is configured so as to be rotatable, and the resolver stator 62, which is provided at the rear side wall portion 73 that is fixed so as not to rotate. The resolver rotor 61 is formed in an annular shape and is fixed on a rear surface of the outer enlarged diameter portion 45 in the coaxial manner with the rotor 31 so as to be located closer to an inner circumferential portion of the outer diameter enlarged portion 45 of the auxiliary output shaft 41. The resolver stator 62 is formed in an annular shape and is arranged radially outwardly of the resolver rotor 61 while keeping a slight clearance therebetween. Furthermore, the resolver stator 62 is supported by plural resolver supporting bases 735, which are provided at the front surface of the rear side wall portion 73 along a circumferential direction thereof. Each of the resolver supporting bases 735 includes a fastener hole into which a supporting bolt 736 is provided in order to support the resolver stator 62 after whose angular position is adjusted. Accordingly, the resolver rotor 61 and the resolver stator 62 are arranged in the coaxial manner while being displaced with each other in the radial direction, so that the resolver rotor 61 is positioned radially inwardly of the resolver stator 62. As a result, an angle formed between the resolver rotor 61 and the resolver stator 62 may become adjustable. The resolver supporting bases 735 and the supporting bolts 736 serve as an angle adjusting member.

Figure 3:
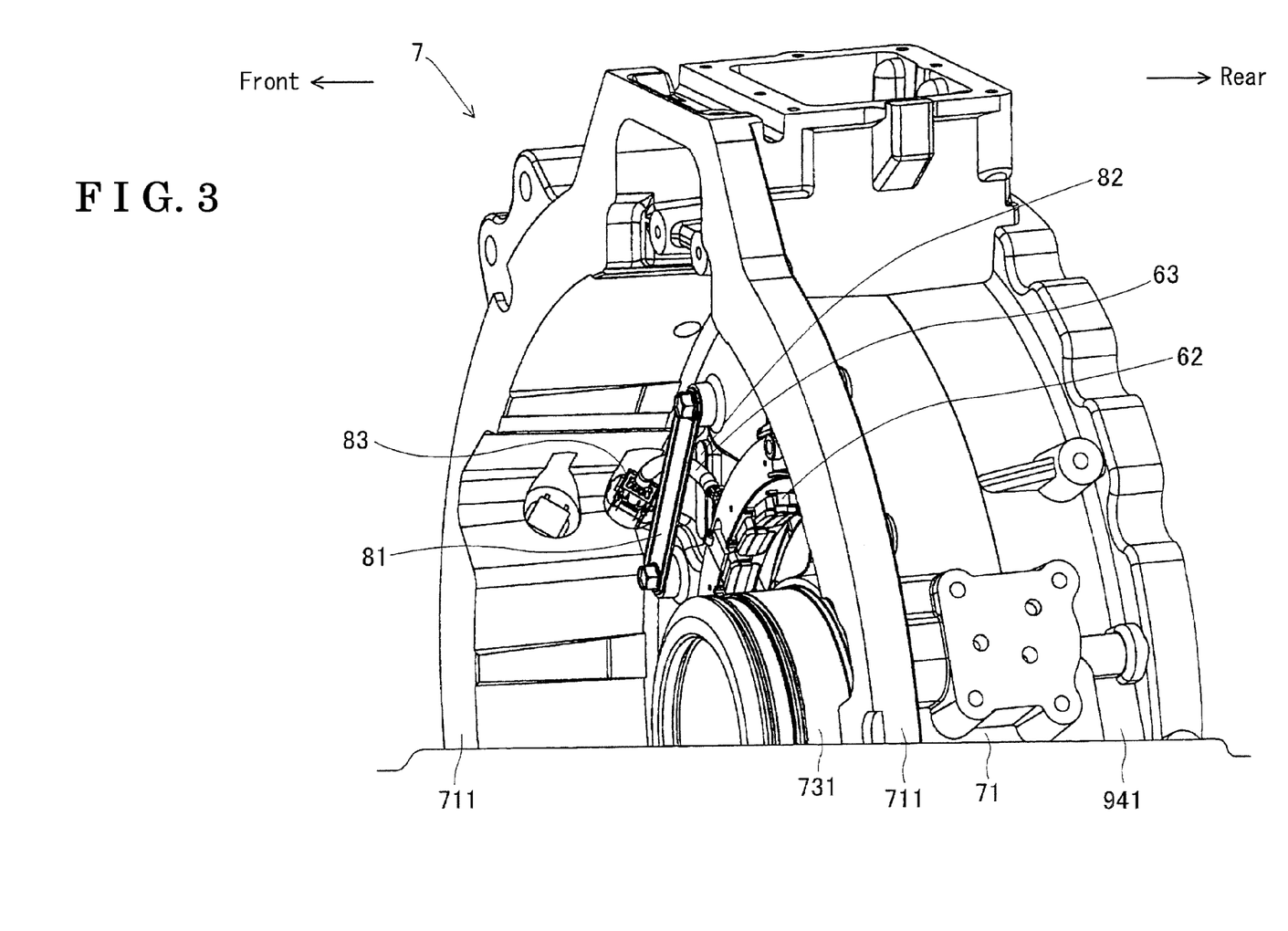
FIG. 3 is a perspective view illustrating a configuration of retaining a resolver harness at a rear side wall portion configuring the case.
Figure 4:
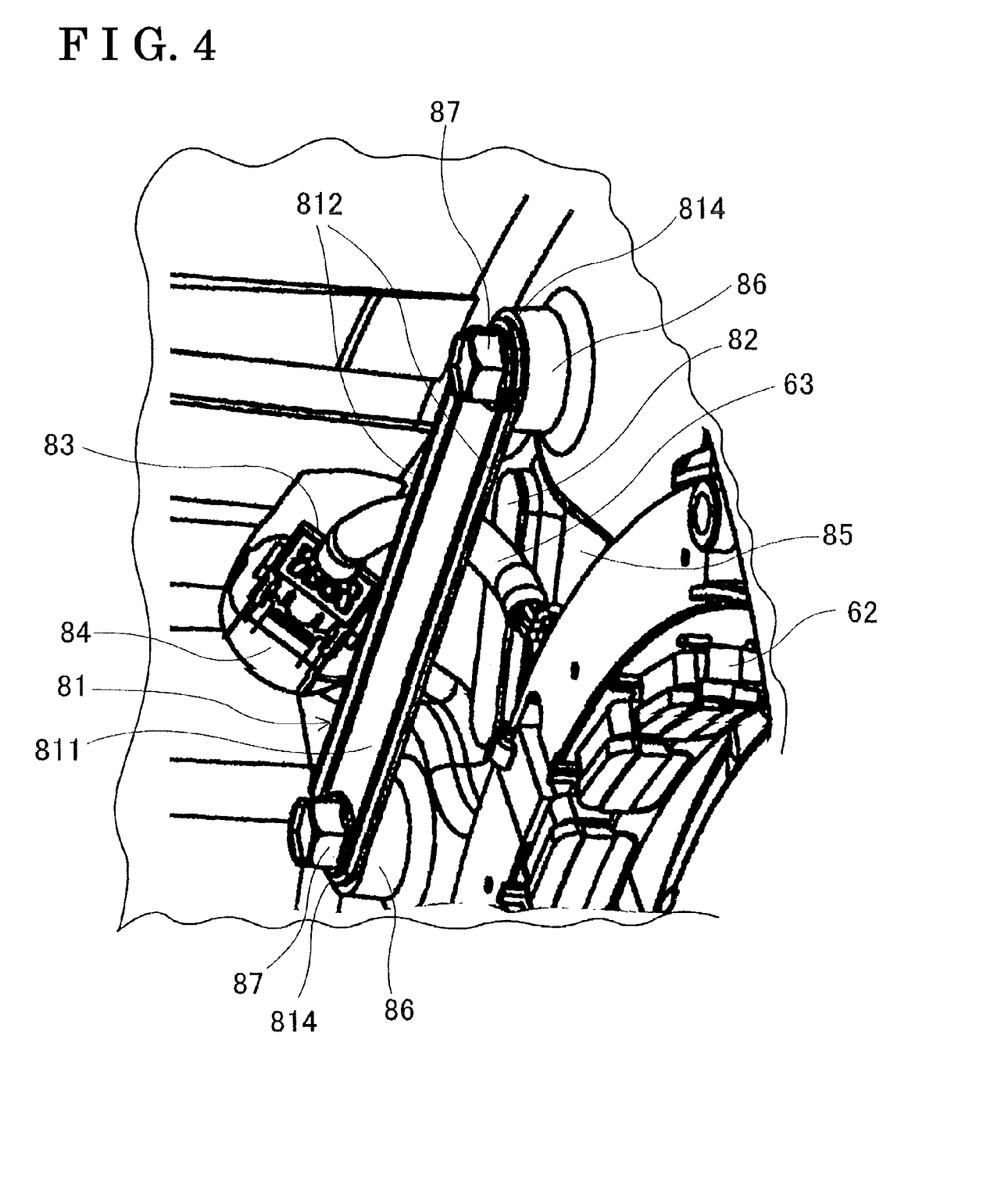
FIG. 4 is a partially enlarged diagram of FIG. 3.

A resolver harness 63 is connected to the resolver stator 62, so that information relating to the detected angle is outputted therethrough. Illustrated in FIG. 3 is a perspective view for explaining a configuration of holding the resolver harness 63 at the rear side wall portion 73 configuring the case 7. More specifically, illustrated in FIG. 3 is an upper half of the circumferential wall portion 71 and the rear side wall portion 73, which configure the case 7, and the resolver stator 62. Furthermore, illustrated in FIG. 4 is a partially enlarged diagram of FIG. 3. As illustrated in FIGS. 3 and 4, the resolver harness 63 extends in the radially outward direction from a portion of an outer circumferential portion of the resolver stator 62, which is formed in the annular shape. The resolver harness 63 is held while allowing the resolver harness 63 to be movable between a clamp member 81 and an island portion 82.

Figure 5:
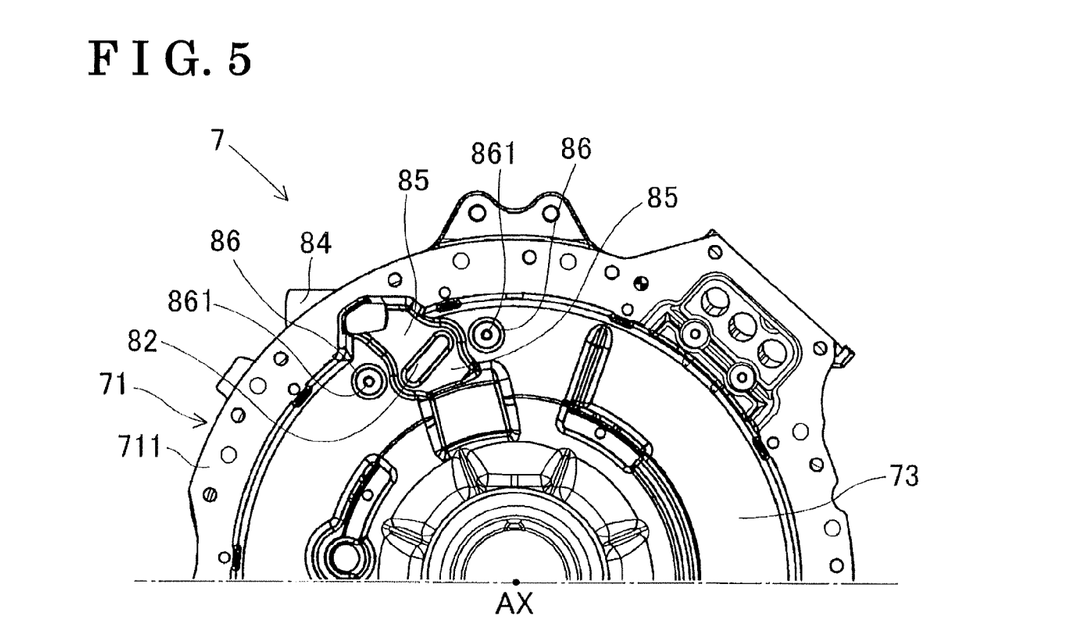
FIG. 5 is a front view of the case illustrated in FIG. 3.

Firstly, a configuration of the case 7 will be described below in detail. Illustrated in FIG. 5 is a front view of the case 7 illustrated in FIG. 3. As illustrated in FIG. 5, a harness guiding portion 84 in a cylinder shape is provided at a diagonally upper portion of the circumferential wall portion 71, which configures the case 7. The harness guiding portion 84 accommodates a relay terminal block 83 and guides the resolver harness 63 to an outside of the case 7.

A portion of the rear side wall portion 73 is formed to rearwardly dent to form a groove portion 85 in the vicinity of the resolver harness 63, which is arranged (wired) so as to extend from the resolver stator 62 to the harness guiding portion 84. A width of the groove portion 85 is set to be sufficiently wider than a conceivable range within which the resolver harness 63 moves. The island portion 82, which protrudes in a rounded rectangular shape (i.e. a shape obtained by replacing short sides of a rectangle by semicircles, respectively), is left on the groove portion 85 so as to cross a center portion of the groove portion 85 and so as to cross the resolver harness 63. The case 7 is formed by casting. A casting surface of the island portion 82 is processed by polishing in order to obtain a smooth processed surface. Clamp attachment bases 86 (i.e. attachment bases) are formed at each of banks of the groove portion 85 so as to forwardly protrude therefrom (i.e. towards a near side of a reader in FIG. 5) and so as to be located at positions across the island portion 82. Each of the clamp attachment bases 86 is formed in a column shape. Furthermore, an attachment screw bore 861 is formed at a center portion of each of the clamp attachment bases 86.

Figure 6A:
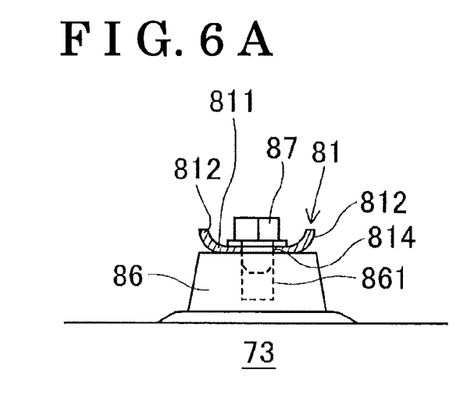
FIG. 6A is a diagram for explaining an attachment of a clamp member when the clamp member is normally attached.

As illustrated in FIG. 4, the clamp member 81 is bridged over the groove portion between the clamp attachment bases 86 so as to be substantially in parallel with the island portion 82. The clamp member 81 includes a parallel portion 811, which extends in a longitudinal direction in parallel with the rear side wall portion 73, and curved portions 812, which are formed to smoothly curve so as to be away from the rear side wall portion 73 from respective side edge portions of the parallel portion 811 in a width direction thereof. Furthermore, an attachment hole 814 (i.e. an attachment portion) is formed at each end portion of the parallel portion 811 of the clamp member 81 in the longitudinal direction. Additionally, a surface of the clamp member 81 is processed to become smooth. As illustrated in FIG. 6A, the clamp member 81 is attached on the clamp attachment bases 86 in a manner that attachment bolts 87 are inserted into the attachment holes 814 and are screwed on the attachment screw bores 861, respectively.

Figure 6B:
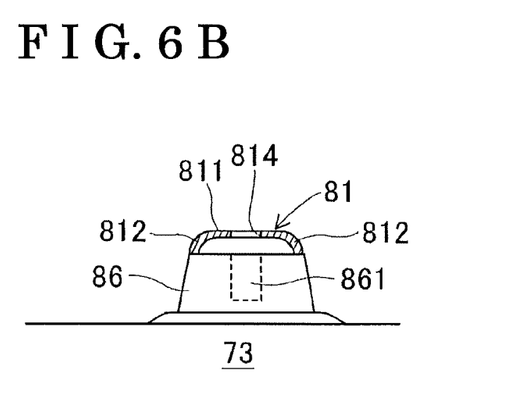
FIG. 6B is a diagram for explaining the attachment of the clamp member when the clamp member is incorrectly attached.

Illustrated in FIG. 6A is a state where the clamp member 81 is correctly attached on the clamp attachment bases 86. On the other hand, illustrated in FIG. 6B is a state where the clamp member 81 is attached on the clamp attachment bases 86 inside out. In the case that the clamp member 81 is correctly attached on the clamp attachment bases 86 (i.e. a correctly attached state), a portion of the parallel portion 811 of the clamp member 81 contacts each clamp attachment base 86, so that each attachment bolt 87 is allowed to be screwed. On the other hand, in the state illustrated in FIG. 6B, end surface of each curved portion 812 of the clamp member 81, which is incorrectly arranged inside out, in the width direction contacts upper surfaces of the respective clamp attachment base 86, so that a space is formed between the parallel member 811 and the upper surfaces of the respective clamp attachment bases 86. Therefore, in this case, the attachment bolts 87 are not allowed to be screwed on the respective attachment screw bores 861. Accordingly, the clamp member 81 may be avoided from being incorrectly attached inside out on the clamp attachment bases 86.

The resolver harness 63 is arranged (wired) between the clamp member 81 and the island portion 82 so as to be substantially orthogonal to the clamp member 81 and the island portion 82 while allowing the resolver harness 63 to be movable. Furthermore, the resolver harness 63 is guided to the harness guiding portion 84 and is connected to the relay terminal block 83, so that the resolver harness 63 is guided to extend to the outside of the case 7. Additionally, a height of each of the clamp attachment bases 86 is preliminarily designed so that a distance between the clamp member 81 and the island portion 82 becomes greater than an outer diametrical size of the resolver harness 63. Furthermore, a length of the resolver harness 63 is set to have a slight allowance in preparation for a conceivable movement of the resolver harness 63. Therefore, the resolver harness 63 is held while being allowed to be movable between the clamp member 81 and the island portion 82.

Advantages and merits of the drive device 1 for the hybrid vehicle having the above-mentioned configuration will be described below. In a case that the angular position of the resolver stator 62 relative to the resolver rotor 61 is adjusted, the resolver harness 63, which is connected to the resolver stator 62, may also be moved, so that an arrangement position (i.e. a wiring position) may be changed. In this case, according to the embodiment, because the length of resolver harness 63 is set to have the allowance, the resolver harness 63 is allowed to move between the clamp member 81 and the island portion 82. Therefore, a tensile force (i.e. a pulling force) is not likely to be applied to the resolver harness 63, which tends to occur due to lack of the length of the resolver harness 63. Accordingly, the resolver harness 63 may be avoided from being broken.

According to the embodiment, because the length of the resolver harness 63 is set to have the allowance, the resolver harness 63 may fluctuate (move) due to a vibration of the vehicle. However, the drive device 1 is configured so that the resolver harness 63 is not moved over the parallel portion 811 of the clamp member 81 in a forward direction and further, the resolver harness 63 is not likely to receive a large external force from the curved portions 812, which are formed to smoothly curve. In other words, because the resolver harness 63 may be rubbed against the clamp member 81 or the island portion 82, each of which is processed to have the smooth surface in the case that the resolver harness 63 fluctuates (moves), the resolver harness 63 is not likely to be damaged and further, the resolver harness 63 is not likely to contact the rotating portion such as the rotor 31 and the like.

In this embodiment, the resolver 6 is used as an example of the rotation angle sensor. However, other sensors may be adapted as the rotation angle sensor. Furthermore, in the embodiment, the rotor 31 is arranged at the radially inward portion of the motor 3. The auxiliary output shaft 41 according to the embodiment is formed so that the rotating section has the S-shape. However, the configurations of the motor 3 and the auxiliary output shaft 41 are not limited to the above described examples. Still further, the case 7 of the drive device 1 for the hybrid vehicle may be adapted to other case of a motor. Various changes and modifications may be adaptable to the drive device 1 for the hybrid vehicle and the case 7 for the drive device 1.

According to the embodiment, the drive device 1 for the hybrid vehicle includes the input shaft 2 rotatably connected to the engine 91, the motor 3 having the rotor 31 and the stator 32, the output shaft 4 arranged on the rotation axis AX in the coaxial manner with the rotor 31 so as to be integrally connected to the rotor 31 as the unit and configured so as to be engaged with and disengaged from the input shaft 2, the resolver 6 including the resolver rotor 61, which is provided at the rotor 31 so as to rotate together with the rotor 31 as the unit, and the resolver stator 62, which is provided so as not to be rotate and which forms the angle relative to the resolver rotor 61, and detecting the rotation angle of the rotor 31, and the case 7 rotatably and axially supporting the input shaft 2 and the output shaft 4 on the rotation axis AX and accommodating the motor 3 and the resolver 6, wherein the rear side wall portion 73 of the case 7, which extends in the direction orthogonal to the rotation axis AX, includes the angle adjusting member (735, 736) supporting the resolver stator 62 of the resolver 6 in the coaxial manner relative to the rotation axis AX while allowing the angle of the resolver stator 62 to be adjustable, and the clamp member 81 supporting a resolver harness 63, which is connected to the resolver stator 62 of the resolver 6, while allowing the resolver harness to be movable.

Accordingly, the resolver 6 includes the resolver rotor 61 and the resolver stator 62. The rear side wall portion 73 of the case 7 includes the angle adjusting member (735, 736), which supports the resolver rotor 61 while allowing the angle of the resolver rotor 61 to be adjustable, and the clamp member 81 supporting the resolver harness 63, which is connected to the resolver stator 62, while allowing the resolver harness 63 to be movable. Therefore, in the case that the resolver 6 is attached at the drive device 1 for the hybrid vehicle after the angular position of the resolver stator 62 is adjusted, the resolver harness 63 may be supported by the clamp member 81 even in the case that the attachment position of the resolver harness 63 changes. Therefore, the resolver harness 63 is not likely to be broken, which occurs due to lack of the length of the resolver harness 63 and the tensile force applied thereto. Furthermore, even in the case that the resolver harness 63 fluctuates (moves) due to the vibration of the hybrid vehicle because the length of the resolver harness 63 is set to have the allowance, the resolver harness 63 is avoided from contacting a rotating portion such as the rotor 31 and the like because the resolver harness 63 is supported by the clamp member 81. Still further, when comparing to a known wiring structure disclosed in JP2009-154824A, the clamp member 81 of this embodiment is simpler, therefore a reliability of a harness holding configuration may be achieved with low manufacturing costs.

According to the embodiment, the case 7 is formed by casting, the casting surface of the case 7 facing the clamp member 81 is processed to be smooth, and the resolver harness 63 is positioned between the clamp member 81 and the smoothly processed surface of the case 7, so that the resolver harness 63 is supported by the clamp member 81 and the smoothly processed surface of the case 7 while allowing the resolver harness 63 to be movable.

Accordingly, the case 7 is formed by casting. The processed surface of the case 7 facing the clamp member 81 is processed to be smooth. The resolver harness 63 is supported between the smoothly processed surface of the case 7 and the clamp member 81 while the resolver harness 63 is allowed to be movable therebetween. Therefore, even in the case that the resolver harness 63 s rubbed against the case inner surface because of the vibration of the hybrid vehicle and the like, the resolver harness 63 may be avoided from being damaged because the case inner surface includes the processed smooth surface.

According to the embodiment, the clamp member 81 includes the parallel portion 811 extending in a longitudinal direction of the clamp member 81 so as to be in parallel with the rear side wall portion 73 and the curved portions 812, which are obtained by curving respective side end portions of the parallel portion 811 in the width direction thereof so as to extend away from the rear side wall portion 73, and the clamp member 81 is arranged so that the longitudinal direction thereof extends orthogonally to the resolver harness 63.

Accordingly, the clamp member 81 includes the parallel portion 811, which extends in the longitudinal direction so as to be in parallel with the rear side wall portion 73, and the curved portions 812, which are obtained by smoothly curving the side end portions of the parallel portion 811 in the width direction, respectively. The clamp member 81 is arranged so that the longitudinal direction thereof becomes orthogonal to the resolver harness 63. Therefore, even in a case that the resolver harness 63 moves in the longitudinal direction of the clamp member 81, the resolver harness 63 is not likely to move over the parallel portion 811 in the forward direction. Furthermore, even in a case that the resolver harness 63 moves in the width direction of the clamp member 81, the resolver harness 63 is not likely to receive the large external force from the smoothly curved portions 812. Therefore, the resolver harness 63 is not likely to be damaged.

According to the embodiment, the clamp member 81 includes the attachment holes 814 at the end portions of the parallel portion 811 in the longitudinal direction, respectively, the rear side wall portion 73 includes the clamp attachment bases 86, at which the attachment holes 814 of the clamp member 81 are fixed. In the case that the clamp member 81 is incorrectly attached on the rear side wall portion 73, the curved portions 812 contact the clamp attachment bases 86 of the rear side wall portion 73, so that the clamp member 81 is avoided from being incorrectly attached on the rear side wall portion 73.

Accordingly, the clamp member 81 includes the clamp attachment holes 814 at the end portions of the parallel portion 811 in the longitudinal direction, respectively. The rear side wall portion 73 includes the clamp attachment bases 86. Therefore, in the case where the clamp member 81 is incorrectly attached on the rear side wall portion 73 inside out, the curved portions 812 contacts the clamp attachment bases 86. Therefore, the clamp member 81 may be avoided from being incorrectly attached on the rear side wall portion 73. Consequently, because the clamp member 81 is surely and correctly attached on the rear side wall portion 73, the resolver harness 63 is not likely to be damaged.

According to the embodiment, the rotation angle sensor includes the resolver 6. The rotating portion of the rotation angle sensor includes the resolver rotor 61 fixed on the rotor 31 in the coaxial manner. The fixed portion of the rotation angle sensor includes the resolver stator 62. The clamp member 81 supports the resolver harness 63, which is connected to the resolver stator 62, while allowing the resolver harness 63 to be movable.

Accordingly, the resolver 6 is adapted as the rotation angle sensor. In the case that the resolver 6 is used for the drive device 1 for the hybrid vehicle, advantages and merits may be achieved for the resolver harness 6), which is connected to the resolver stator 62.

According to the embodiment, the case 7 includes the motor 3 having the rotor 31, the resolver 6 including the resolver rotor 61, which is provided at the rotor 31 and is rotated together with the rotor 31 as the unit, and the resolver stator 62, which does not rotate and which forms the angle relative to the resolver rotor 61, and detecting the rotation angle of the rotor 31, and the clamp member 81 including the rotation adjusting member (735, 736), which arranges the resolver stator 62 of the resolver 6 to be coaxial relative to the rotation axis AX of the rotor 31 and which adjusts the angle formed between the resolver stator 62 and the resolver rotor 61, and supporting the resolver harness 63, which is connected to the resolver stator 62, while allowing the resolver harness 63 to be movable.

Accordingly, the case 7 includes the angle adjusting member (735, 736) and the clamp member 81. The angle adjusting member (735, 736) arranges the resolver stator 62 of the resolver 6 to be coaxial relative to the rotation axis AX of the rotor 31 and adjusts the angle formed between the resolver stator 62 and the resolver rotor 61. The clamp member 81 supports the resolver harness 63, which is connected to the resolver stator 62, while allowing the resolver harness 63 to be movable. Therefore, the resolver harness 63 may be avoided from being damaged and broken. Furthermore, the resolver harness 63 may be avoided from contacting the rotating portion such as the rotor 31 and the like. The case 7 of this embodiment may be adaptable to other case of a motor and the like. Even in this case, above-mentioned advantages and merits may be obtained.

According to the embodiment, the inner surface of the case 7 facing the clamp member 81 is formed to have the smoothly processed surface, and the resolver harness 63 is positioned between the smoothly processed surface of the case 7 and the clamp member 81, so that the resolver harness 63 is supported by the smoothly processed surface of the case 7 and the clamp member 81 while allowing the resolver harness 63 to be movable.

Accordingly, the resolver harness 63 is positioned between the clamp member 81 and the smoothly processed surface of the case inner surface, so that the resolver harness 63 is supported by the clamp member 81 and the smoothly processed surface of the case inner surface. As a result, the resolver harness 63 may be avoided from being damaged.

According to the embodiment, the attachment bolt 87 is inserted into each of the attachment holes 814 and the attachment bolt 87 is screwed on the attachment screw bore 861 formed at each of the clamp attachment bases 86, so that the clamp member 81 is attached on the clamp attachment bases 86.

According to the embodiment, each of the clamp attachment bases 86 is formed in the column shape and the attachment screw bore 861 is formed at the intermediate portion of each of the clamp attachment bases 86 in the axial direction thereof on the vertical section.

According to the embodiment, the portion of the rear side wall portion 73 is partially dent in the vicinity of the resolver harness 63 so as to form the groove portion 85, and the island portion 82, which protrudes from the groove portion 85 in the rounded rectangular shape, is formed so as to cross the intermediate portion of the groove portion 85 and so as to extend orthogonally to the resolver harness 63.

According to the embodiment, the clamp member 81 is arranged so as to extend between two clamp attachment bases 86 and so as to be in parallel with the island portion 82.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A drive device for a hybrid vehicle, comprising:
an input shaft rotatably connected to an engine;
a motor having a rotor and a stator;
an output shaft arranged on a rotation axis in a coaxial manner with the rotor so as to be integrally connected to the rotor as a unit and configured so as to be engaged with and disengaged from the input shaft;

a rotation angle sensor detecting a rotation angle of the rotor, the rotation angle sensor including a rotating portion, which is provided at the rotor so as to rotate together with the rotor as a unit, and a fixed portion, which is provided so as not to rotate and which forms an angle relative to the rotating portion;

a case rotatably and axially supporting the input shaft and the output shaft on the rotation axis and accommodating the motor and the rotation angle sensor wherein a side wall portion of the case, which extends in a direction orthogonal to the rotation axis, includes an angle adjusting member supporting the fixed portion of the rotation angle sensor in a coaxial manner relative to the rotation axis while allowing the angle of the fixed portion to be adjustable, and a clamp member supporting a harness, which is connected to the fixed portion of the rotation angle sensor, while allowing the harness to be movable;

wherein the case is formed by casting, a casting surface of the case facing the clamp member is processed to be smooth, and the harness is positioned between the clamp member and the smoothly processed surface of the case, so that the harness is supported by the clamp member and the smoothly processed surface of the case while allowing the harness to be movable; and the clamp member includes a parallel portion extending in a longitudinal direction of the clamp member so as to be parallel with the side wall portion and curved portions, which are obtained by curving respective side end portions of the parallel portion in a width direction thereof so as to extend away from the side wall portion, and the clamp member is arranged so that the longitudinal direction thereof extends orthogonally to the harness.

2. The drive device for the hybrid vehicle according to claim 1, wherein the clamp member includes attachment portions at end portions of the parallel portion in the longitudinal direction, respectively, the side wall portion includes attachment bases, and in a first orientation of the clamp member, the attachment portions of the clamp member are fixed to the attachment bases, and in an orientation of the clamp member other than the first orientation of the clamp member, the curved portions contact the attachment bases of the side wall portion preventing the attachment portions of the clamp member from being fixed to the attachment bases.

3. The drive device for the hybrid vehicle according to claim 2, wherein an attachment bolt is inserted into each of the attachment portions and the attachment bolt is screwed on an attachment screw bore formed at each of the attachment bases, so that the clamp member is attached on the attachment bases.

4. The drive device for the hybrid vehicle according to claim 3, wherein each of the attachment bases is formed in a column shape and the attachment screw bore is formed at an intermediate portion of each of the attachment bases in an axial direction thereof on a vertical section.

5. The drive device for the hybrid vehicle according to claim 1, wherein the rotation angle sensor includes a resolver, the rotating portion of the rotation angle sensor includes a resolver rotor fixed on the rotor in the coaxial manner, the fixed portion of the rotation angle sensor includes a resolver stator, and wherein the harness is connected to the resolver stator.

6. The drive device for the hybrid vehicle according to claim 5, wherein a portion of the side wall portion is partially bent in the vicinity of the harness so as to form a groove portion, and an island portion, which protrudes from the groove portion in a rounded rectangular shape, is formed so as to cross an intermediate portion of the groove portion and so as to extend orthogonally to the harness.

7. The drive device for the hybrid vehicle according to claim 6, wherein the clamp member is arranged so as to extend between two of the attachment bases and so as to be in parallel with the island portion.

8. A case comprising:
a motor having a rotor;
a rotation angle sensor including a rotating portion, which is provided at the rotor and is rotated together with the rotor as a unit, and a fixed portion, which does not rotate and which forms an angle relative to the rotating portion, and detecting a rotation angle of the rotor; and
a rotation adjusting member arranging the fixed portion of the rotation angle sensor to be coaxial relative to a rotation axis of the rotor and adjusting the angle formed between the fixed portion and the rotating portion; and
a clamp member supporting a harness, which is connected to the fixed portion, while allowing the harness to be movable; wherein
the clamp member includes a parallel portion extending in a longitudinal direction of the clamp member so as to be parallel with a side wall portion and curved portions, which are obtained by curving respective side end portions of the parallel portion in a width direction thereof so as to extend away from the side wall portion, and the clamp member is arranged so that the longitudinal direction thereof extends orthogonally to the harness.

9. The case according to claim 8, wherein an inner surface of the case facing the clamp member is formed to have a smoothly processed surface, and the harness is positioned between the smoothly processed surface of the case and the clamp member, so that the harness is supported by the smoothly processed surface of the case and the clamp member while allowing the harness to be movable.

* * * * *